Sept. 8, 1959    A. J. A. BERGSTEDT ET AL    2,903,279
LONGITUDINALLY-DIVIDED SLEEVE TYPE
COUPLING WITH SEALING MEANS
Filed Dec. 26, 1956
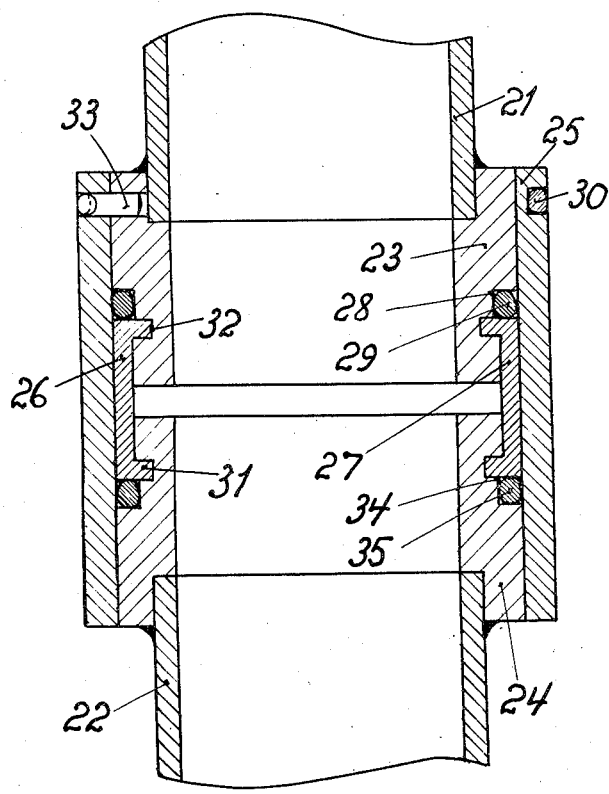
Alf Johan Alexander Bergstedt
Ernst Åke Hilding Rydahl
INVENTORS.
By:
Pierce, Scheffler & Parker
ATTORNEYS.

2,903,279

LONGITUDINALLY-DIVIDED SLEEVE TYPE COUPLING WITH SEALING MEANS

Alf Johan Alexander Bergstedt, Molndal, and Ernst Ake Hilding Rydahl, Borlange, Sweden, assignors to Stora Kopparbergs Bergslags Aktiebolag, a company of Sweden Application December 26, 1956, Serial No. 630,500

Claims priority, application Sweden January 2, 1956

3 Claims. (Cl. 285—373)

The present invention refers to a joint for tubular members. It is an object of the invention to provide a joint by means of which tubular members may easily be connected and disconnected by moving a collar-shaped member axially with respect to the joint. It is a further object of the invention to provide a joint in which the tightening members are seal rings which may easily be inserted or removed after said collar-shaped member has been brought out of engagement with the tubular members. It is a further object of the invention to provide a joint which permits an easy disconnecting of the tubular members also in case said tubular members are under tension owing to thermal contraction or expansion.

The joint according to the invention comprises two tubular members and a collar arranged to surround said tubular members, peripheral grooves on the outer surface of said tubular members, seal rings being provided in said peripheral grooves. The invention resides in the improvement that said collar is arranged to be movable in any axial direction relatively to the tubular members when said tubular members are to be engaged and disengaged.

The invention will now be described more in detail with reference to the accompanying drawing which is a longitudinal central sectional view of the coupling.

The embodiment illustrated in the drawing comprises tubular members 23 and 24, held in position by means of a collar 25, which may be secured to tubular member 23 by means of a lock member 33. Tubular members 23 and 24 are secured to each in the axial direction by means of a sectional locking sleeve consisting of lock members 26 and 27, each such lock member comprising a half-circular collar having inwardly directed flanges 31, engaging peripheral grooves 32 on the tubular members 23 and 24. Tubular members 23 and 24 also contain peripheral grooves 28 and 34, respectively, containing seal rings 29 and 35, respectively. One wall of said grooves 28 and 34 is formed by the edges 31 of lock members 26 and 27. The outer surface of tubular members 23 and 24 has a recessed end portion arranged to receive lock members 26 and 27, so that the periphery of lock members 26 and 27 is in alignment with the outer surface of tubular members 23 and 24.

This joint prevents tubular members 23 and 24 from moving relative to each other in the axial direction, whereas they can rotate relative to each other. If it is desired to prevent such a rotation, grooves 32 may be made as several separate grooves, each cooperating pair of such grooves engaging with a separate lock member. The lock members should preferably be arranged symmetrically with respect to the longitudinal axis of the joint. If desired, grooves 32 may be of greater width that the edges 31 of lock members 26 and 27, tubular members 23 and 24 thereby being able to move relatively to each other in the axial direction to a limited extent.

The distance between the ends of the tubular members 23 and 24 should preferably be somewhat greater than the thickness of a seal ring.

The joint according to the present invention permits a considerable saving of space in comparison with conventional joints having flanges which are connected by means of bolts and nuts. When using the joint according to this invention, several pipe lines may be situated close to each other and close to a wall. In case of a branch pipe, said branch may be turned into the desired direction, independently of any predetermined positions, as in case of flanges.

What I claim is:

1. A pipe joint comprising a pair of colinearly-arranged longitudinally-spaced tubular members each having the same uniform outer diameter, the adjacent ends of said tubular members having colinear cylindrical projecting portions axially extending therefrom, said projecting portions having a common outer diameter smaller than the outer diameter of the tubular members, each of said projecting portions having a first peripheral groove therein intermediate the ends thereof, locking means mutually connecting said pair of tubular members comprising a longitudinally-sectioned tubular locking sleeve having flanges at each end thereof extending radially inwardly into the first peripheral grooves of said tubular member projecting portions, the outer diameter of said sectional locking sleeve being substantially equal to the outer diameter of said tubular members, seal O-rings positioned in second peripheral grooves in each of said tubular members, said second peripheral grooves each having one side wall defined by the end surface of the flange portion of said locking sleeve, a bottom wall defined by the outer periphery of said tubular member projecting portion, and the other side wall defined by the end surface of said tubular member where said projecting portion is connected thereto, said O-rings having an internal diametrical surface contiguous with the outer peripheral surface of the associated projecting portion of said tubular elements and an outer diameter slightly greater than the outer diameter of said tubular members, and a tubular collar open at both ends and having a uniform bore throughout the length thereof, said tubular collar having an internal diameter substantially equal to the outer diameter of the tubular members and of said sectional locking sleeve, said collar surrounding the locking sleeve to retain the sections thereof in engagement with said first peripheral grooves and to radially compress said seal O-rings to provide a fluid seal between said collar and said tubular members, each of said tubular members having at the adjacent ends thereof for lengths equal to the length of said tubular sleeve an outer diameter which does not exceed the internal diameter of said sleeve whereby said sleeve may be axially displaced in either direction to provide ready access to said sectional locking sleeve and said O-rings.

2. A pipe joint as defined in claim 1 wherein the projecting portions of said tubular members are axially spaced a distance greater than the thickness of said seal rings.

3. A pipe joint as defined in claim 1 wherein the first peripheral grooves have a greater width than the thickness of the flanges of said locking sleeve.

References Cited in the file of this patent

UNITED STATES PATENTS

| | | |
|---|---|---|
| 372,568 | Riley | Nov. 1, 1887 |
| 1,538,007 | Schellin | May 19, 1925 |
| 1,622,768 | Cook | Mar. 29, 1927 |
| 2,121,710 | Nielsen | June 21, 1938 |
| 2,516,743 | Allin | July 25, 1950 |
| 2,519,203 | Stoecklin | Aug. 15, 1950 |
| 2,747,900 | Smith | May 29, 1956 |
| 2,826,437 | Detweiler | Mar. 11, 1958 |